United States Patent
Voights et al.

(10) Patent No.: US 7,312,950 B2
(45) Date of Patent: Dec. 25, 2007

(54) AIR STREAM FILTRATION SYSTEM ADJACENT A ROTATIONAL ELEMENT OF A DATA STORAGE DEVICE

(75) Inventors: Ronald L. Voights, Burnsville, MN (US); Yiren Hong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 431 days.

(21) Appl. No.: 10/785,513

(22) Filed: Feb. 23, 2004

(65) Prior Publication Data

US 2005/0185327 A1   Aug. 25, 2005

(51) Int. Cl.
*G11B 33/14* (2006.01)
(52) U.S. Cl. .................................... 360/97.02
(58) Field of Classification Search ............. 360/97.02
See application file for complete search history.

(56) References Cited

U.S. PATENT DOCUMENTS

| | | |
|---|---|---|
| 4,352,133 A | 9/1982 | Hager |
| 4,888,655 A | 12/1989 | Bonn |
| 5,034,835 A | 7/1991 | Yokoyama |
| 5,805,379 A | 9/1998 | Bordes |
| 6,097,568 A | 8/2000 | Ekhoff |
| 6,097,569 A | 8/2000 | Haruyama |
| 6,238,467 B1 | 5/2001 | Azarian |
| 6,285,524 B1 | 9/2001 | Boigenzahn |
| 6,296,691 B1 | 10/2001 | Gidumal |
| 6,395,073 B1 | 5/2002 | Dauber |
| 6,542,328 B2 * | 4/2003 | Harrison et al. ......... 360/97.03 |
| 6,709,498 B2 * | 3/2004 | Tuma ........................... 96/134 |
| 7,130,149 B2 * | 10/2006 | Hong et al. .............. 360/97.02 |
| 2002/0021527 A1 | 2/2002 | Rannow |

* cited by examiner

*Primary Examiner*—A. J. Heinz
(74) *Attorney, Agent, or Firm*—Shumaker & Sieffert, P.A.

(57) ABSTRACT

A system includes at least two discs that rotate about a central axis. The system also includes an actuator mechanism that is configured to position transducing heads and at least one filter disposed between two discs to filter airflow.

24 Claims, 9 Drawing Sheets

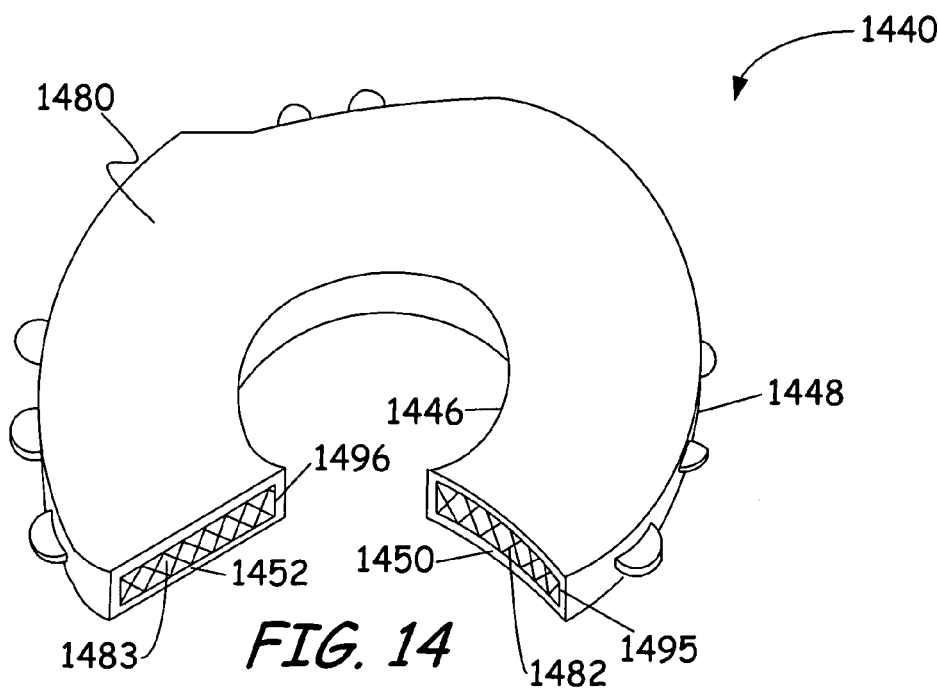
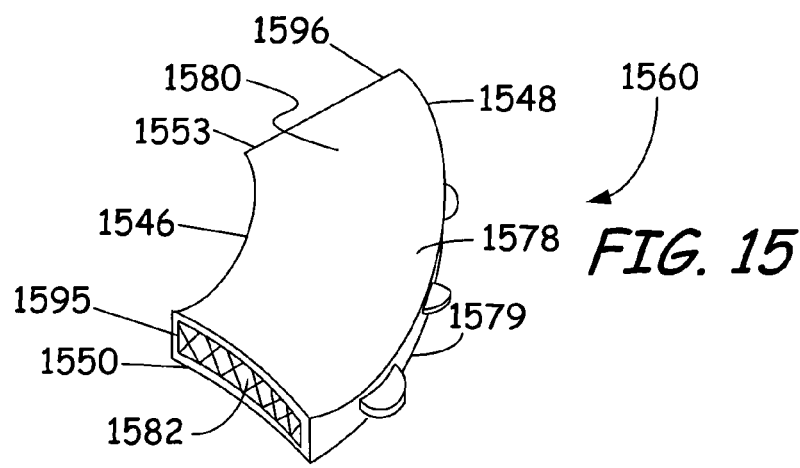
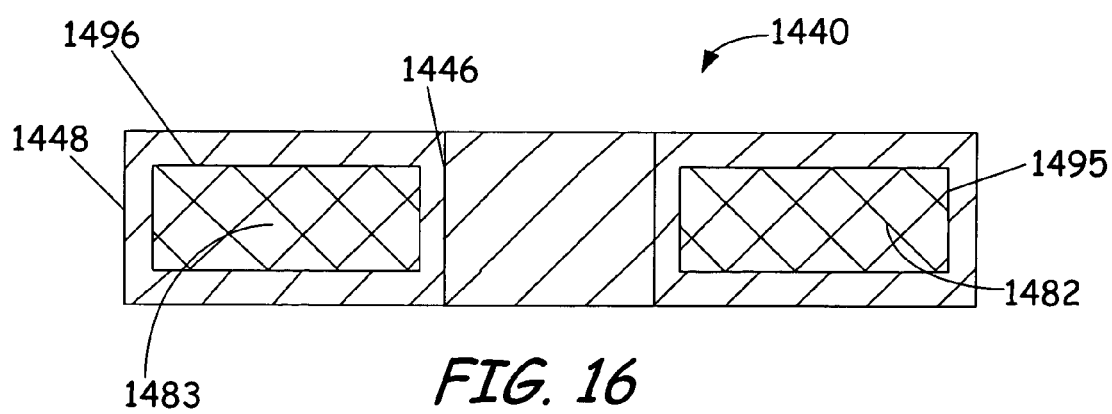

AIR STREAM FILTRATION SYSTEM ADJACENT A ROTATIONAL ELEMENT OF A DATA STORAGE DEVICE

FIELD OF THE INVENTION

The present invention relates generally to methods and components for reducing airborne particles inside data storage systems. In particular, the present invention relates to filtering airborne particles in a data storage system.

BACKGROUND OF THE INVENTION

Disc drives are common data storage devices. A typical disc drive includes a rigid housing that encloses a variety of disc drive components. The components include a plurality of discs having data surfaces that are coated with a medium for storage of digital information in a plurality of circular, concentric data tracks. The discs are mounted on a spindle motor that causes the discs to spin and the data surfaces of the discs to pass under the aerodynamic bearing of the sliders. The is sliders carry transducers, which write information to and read information from the data surfaces of the discs.

To increase recording density, it has become desirable to reduce the fly height over the disc. However, during disc drive operation, the volume of air in the head disc interface (HDI) should be void of contaminants. Serious damage to the disc and a loss of data can result if particles become present in the head disc interface (HDI). Contaminants, such as particles loosely held to the drive components can dislodge and enter the air stream. For example, particles in the HDI can cause performance problems such as media defects, thermal asperities, sanction, or catastrophic drive failure. Further, particles in the HDI can reach the trailing edge (TE) of the slider and damage the sensitive read/write transducers. Even if the disc drive was built free of contaminants, particles can generate whenever at least two disc drive components come in contact.

Disc drives contain filtration systems to protect the disc from these particles. A filtration system generally contains sub-systems such as a recirculation filter, a carbon adsorber, a breather filter and a diffusion path. In addition, air dams and air guides are positioned between the discs to push air from the central axis of the discs towards the recirculation filter and to laminate the airflow. In spite of the use of a variety of different kinds of filtration systems, a portion of the air in the air stream never makes it to the recirculation filter and is recirculated between the discs. This make up air can contain contamination and recirculate over the disc many times before escaping a shroud that surrounds the discs.

Embodiments of the present invention provide solutions to these and/or other problems and offer other advantages over the prior art.

SUMMARY OF THE INVENTION

A system includes at least two discs that rotate about a central axis. The system also includes an actuator mechanism that is configured to position transducing heads and at least one filter disposed between two discs to further filter particles in the airflow that can come between the slider's aerodynamic bearing and disc.

Other features and benefits that characterize embodiments of the present invention will be apparent upon reading the following detailed description and review of the associated drawings.

BRIEF DESCRIPTION OF THE DRAWINGS

FIG. 14 is a perspective view of a filter in accordance with an embodiment of the present invention.
FIG. 15 is a perspective view of a filter in accordance with an embodiment of the present invention.
FIG. 16 is a cross-sectional view of the filter shown in FIG. 14 in accordance with an embodiment of the present invention.

DETAILED DESCRIPTION OF ILLUSTRATIVE EMBODIMENTS

Figure 1:
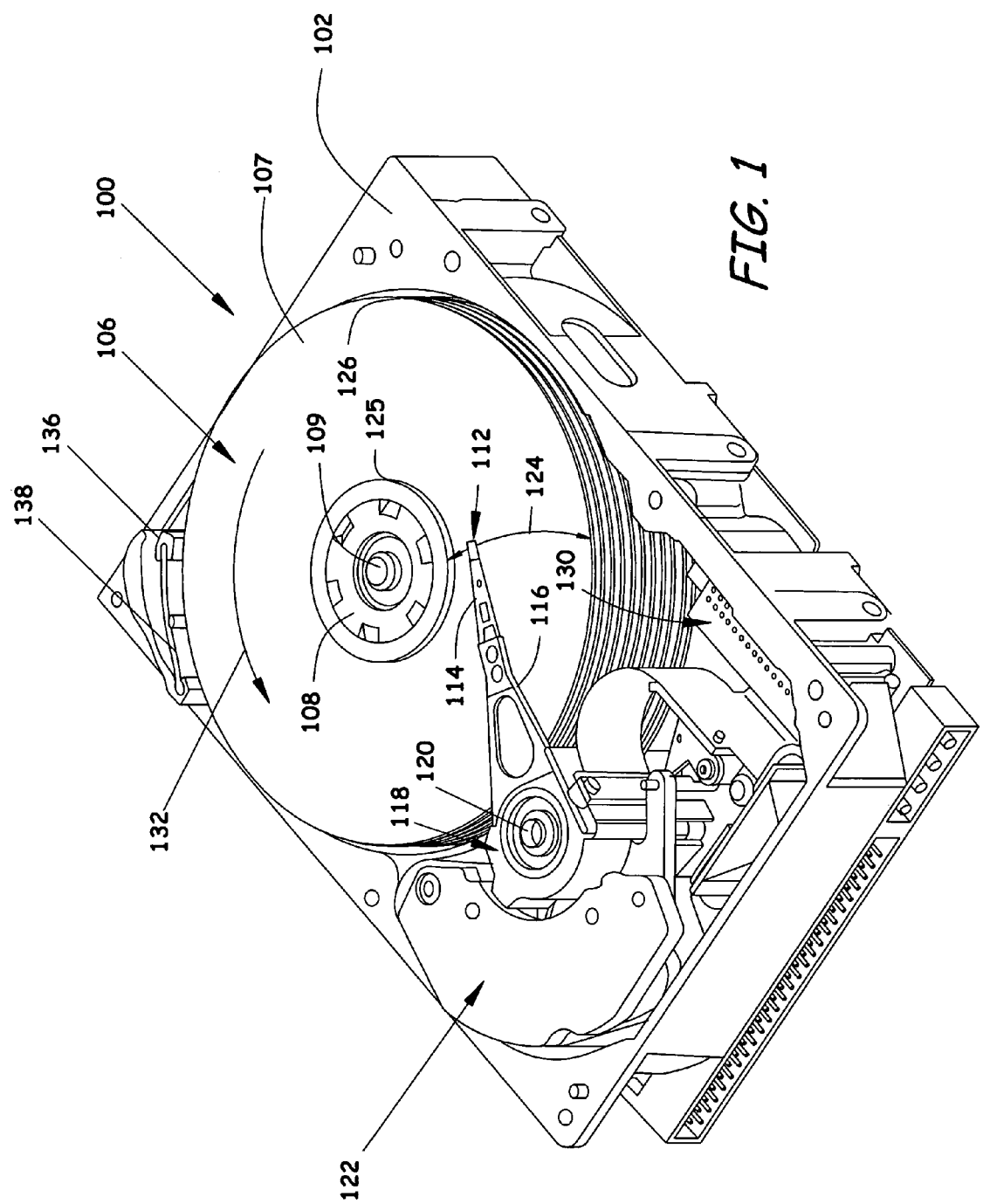
FIG. 1 is a perspective view of a disc drive.

FIG. 1 is a perspective view of a disc drive 100 in which embodiments of the present invention are useful. Disc drives are common data storage systems. Disc drive 100 includes a basedeck 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 112, which carries a read/write head for communication with the surface on each disc 107.

Each slider 112 is supported by a suspension 114 which is in turn attached to a track accessing arm 116 of an actuator mechanism 118. Actuator mechanism 118 is rotated about a shaft 120 by a voice coil motor 122, which is controlled by servo control circuitry within internal circuit 130. As voice coil motor 122 rotates actuator mechanism 118, slider 112 moves in an arcuate path 124 between a disc inner diameter 125 and a disc outer diameter 126.

During operation, as discs 107 rotate in a rotational direction 132, the discs 107 drag air under the respective sliders 112 and along their air bearing surfaces. As the air passes beneath the air bearing surfaces, air compression along the airflow path causes the air pressure between the discs 107 and the air bearing surfaces to increase, which creates an aerodynamic lifting force that counteracts the load force provided by actuator mechanism 118 and causes the sliders 112 to lift and fly above but in close proximity to the disc surfaces. While FIG. 1 illustrates one manner of actuating a data head proximate a data storage medium, the present invention, however, is applicable to data storage systems that use other techniques.

Disc drive 100 is not a closed system. An exchange of air through a breather filter (not shown) equalizes pressure differentials between the internal air of disc drive 100 and the ambient air of the surroundings. This exchange of air may result in the introduction of particles into disc drive 100. In addition, particles can originate in disc drive 100 during its manufacture as well as during operation. For example, intermittent head to disc contact can create debris. Particles pose serious dangers to discs 107 and the heads on sliders 112, especially in high-density systems in which sliders 112 fly very close to discs 107.

Discs 107 induce a significant airflow in disc drive 100 as discs 107 rotate in rotational direction 132. To control contaminants in this airflow, disc drive 100 contains filtration systems such as recirculation filter 138, which is supported by filter support 136. Airflow from the discs exits the outer circumference of the discs and passes through recirculation filter 138 thereby trapping contaminants in the air before the air is recirculated back to disc pack 106.

Figure 2:
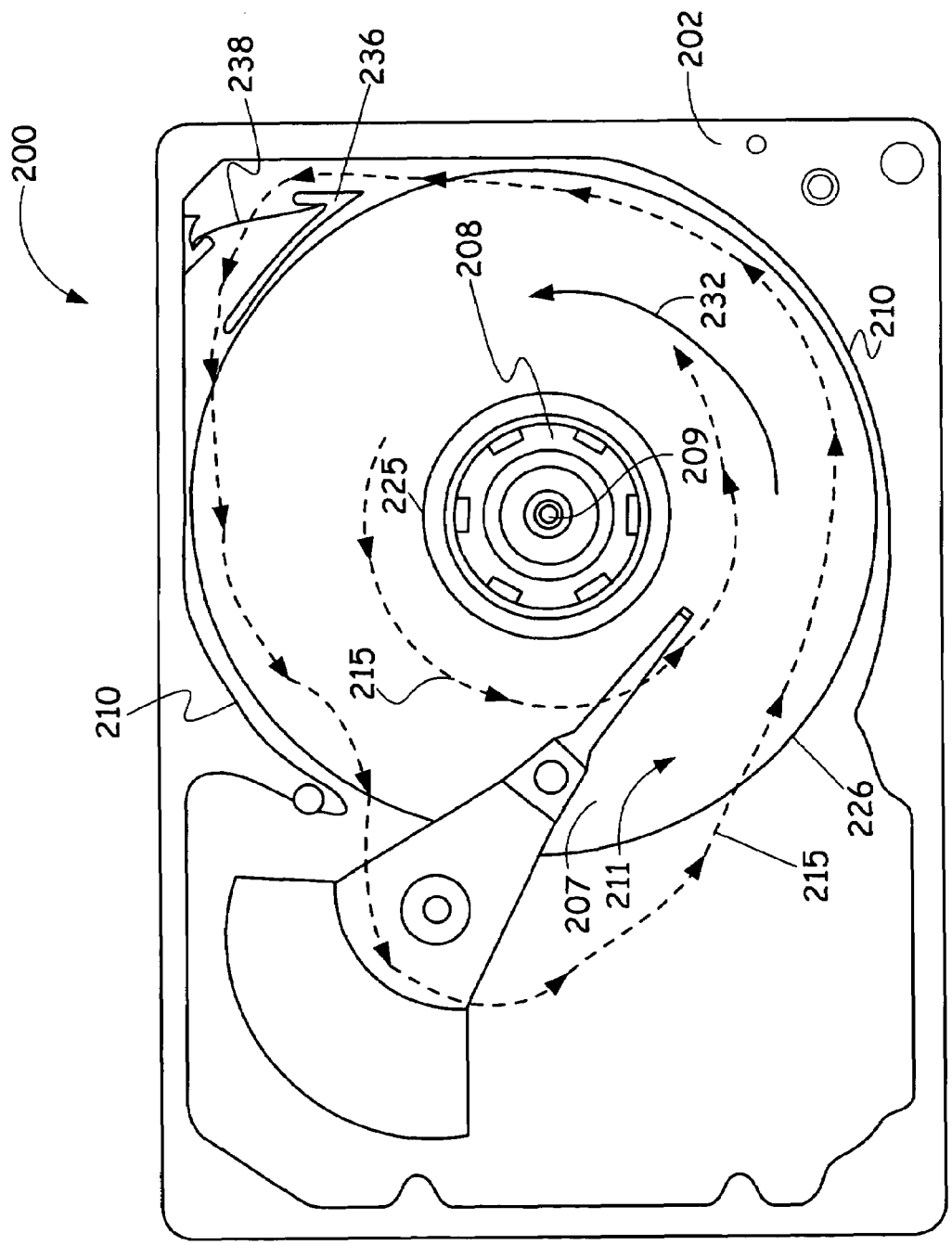
FIG. 2 is a plan view of a prior art disc drive.

FIG. 2 is a plan view of prior art disc drive 200, which includes a basedeck 202. Disc drive 200 includes a plurality of individual discs 207 that are configured to rotate about central axis 209 and that are secured to a spindle motor (not shown) by disc clamp 208. Disc drive 200 also includes filter support 236 configured to support recirculation filter 238 near a shroud wall 210.

Discs 207 have disc surfaces that extend from a disc inner diameter 225 to an outer diameter 226. A layer of air adjacent to disc surfaces 211 is subject to contamination by particles. During operation, discs 207 spin about a central axis 209 in a rotational direction 232. The spinning of discs 207 induces the layer of air within disc drive 200 to have a velocity thereby generating airflow 215. Airflow 215 can carry undesirable particles. A portion of airflow 215 passes through recirculation filter 238.

In spite of the use of recirculation filter 238, there is still a need to reduce the presence of airborne particles in disc drive 200. While recirculation filter 238 has high particle collection efficiency, disc drive 200 has no mechanism to force one hundred percent of the airflow through recirculation filter 238. For example, a portion of the airflow 215 never makes it to recirculation filter 238. This portion of airflow 238 can recirculate between discs 207 many times before escaping shroud 210 that surrounds discs 207. A reduction of particles between discs 207 can reduce incidence of lost data or mechanical damage as the density of data storage increases and the dimensions of components and tolerance for the presence of particles decreases.

Figure 3:
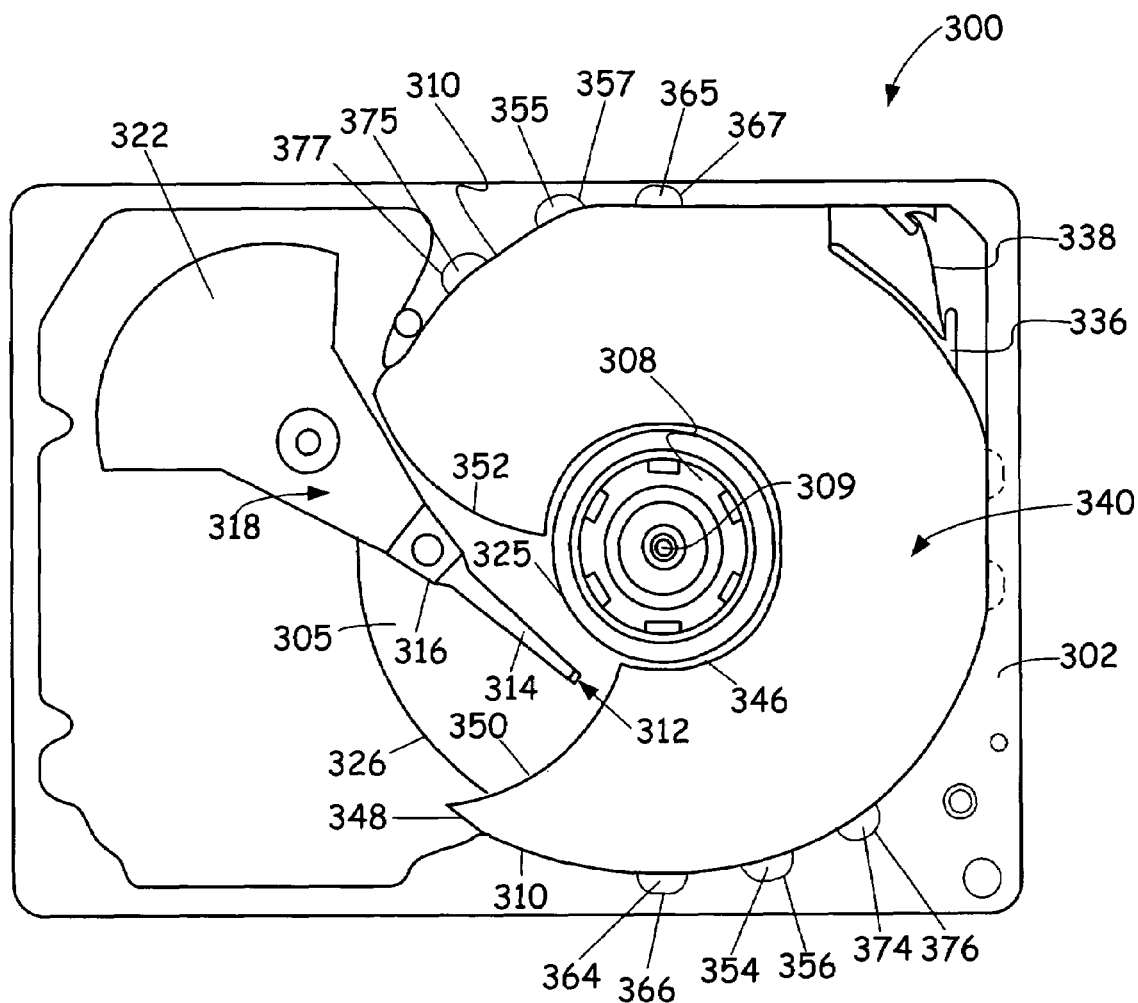
FIG. 3 is a plan view of a disc drive in accordance with an embodiment of the present invention.
Figure 4:
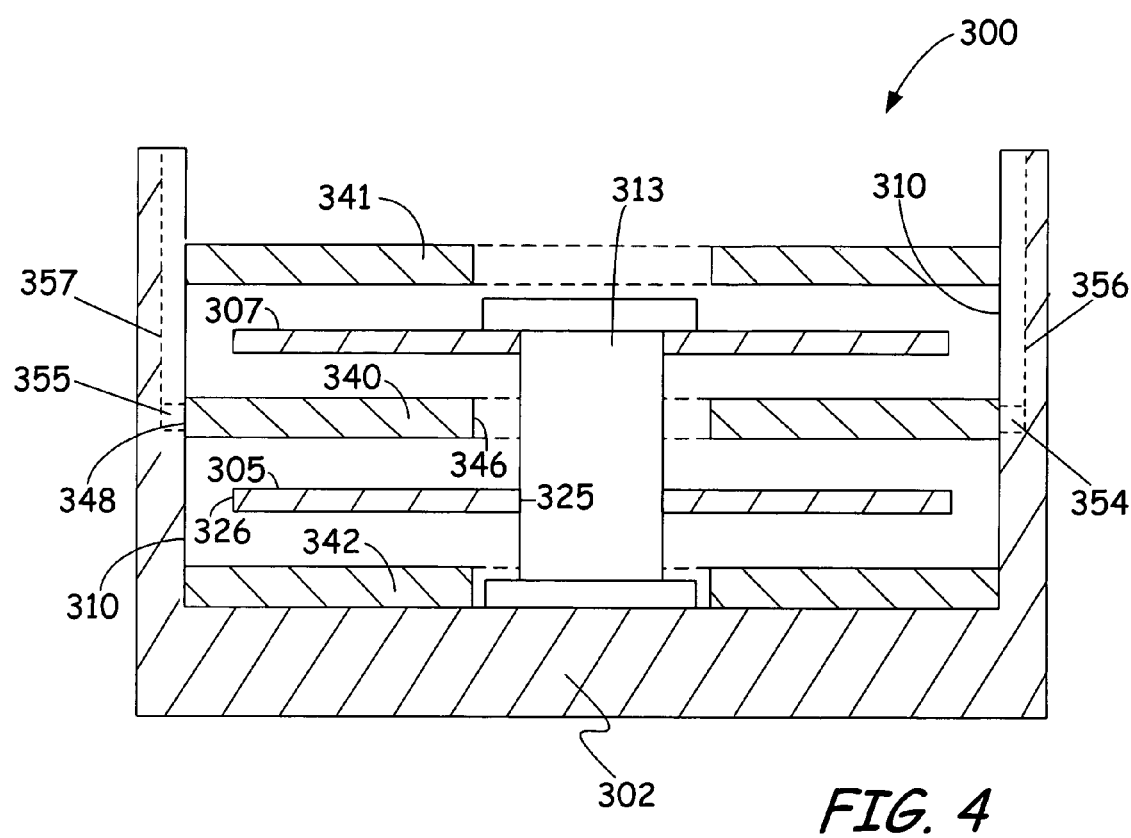
FIG. 4 is a cross-sectional view of the disc drive shown in FIG. 3 in accordance with an embodiment of the present invention.

FIG. 3 is a plan view of disc drive 300 in accordance with an embodiment of the present invention. FIG. 4 is a cross-sectional view of disc drive 300 as shown in FIG. 3. FIG. 4 illustrates disc drive 300 having a filter 340 disposed between at least two discs 305 and 307. FIG. 3 illustrates the topmost disc 307 and a topmost filter 341 removed to expose filter 340 in greater detail.

In one aspect of the present invention, at least one filter 340 is disposed within disc drive 300 to collect particles that contaminate the airflow. Filter 340 is disposed between and substantially parallel to discs 305 and 307. As shown in FIG. 4, disc drive 300 can also have filter 341 positioned above disc 307 and filter 342 positioned below disc 305. If additional discs are placed in the storage system, a filter, such as filter 340, can be placed between each pair of discs. In the discussion below, the shape of filter 340 is described. Those skilled in the art will recognize that filters 341 and 342 have similar shapes although not explicitly described.

Filter 340 has a substantially circular inner circumference 346 that approaches inner disc diameter 325 and a substantially circular outer circumference 348 adjacent shroud wall 310. Filter 340 radially extends from inner circumference 346 to outer circumference 348. Filter 340 also includes leading edge 350 located downstream of sliders 312 and trailing edge 352 positioned upstream of sliders 312. Filter 340 angularly extends from leading edge 350 to trailing edge 352. For example, leading edge 350 can have a shape which matches the arcuate path of actuator mechanism 318 such that actuator mechanism 318 may be disposed in close relationship to leading edge 350 while allowing free movement of actuator mechanism 318. Both leading edge 350 and trailing edge 352 are bound by inner circumference 346 and outer circumference 348.

Filter 340 of FIGS. 3 and 4 includes a plurality of tabs, such as tabs 354 and 355, located along the outer circumference 348 of filter 340. Basedeck 302 of FIGS. 3 and 4 includes a plurality of grooves, such as grooves 356 and 357, located along shroud wall 310. Each of the plurality of tabs correspond with each of the plurality of grooves such that filter 340 is mounted to basedeck 302. Filter 341 includes tabs 364 and 365 and filter 342 includes tabs 374 and 375, which are located along the outer circumferences of those filters and fit within grooves 366, 367, 376 and 377, respectively, along the shroud wall 310. Each of the plurality of filters 340, 341 and 342 is independently mounted to basedeck 302 by engaging the plurality of tabs to the bottom of the plurality of grooves. Under one embodiment, the tabs are connected to the bottom of the grooves by screws.

During manufacture of disc drive 300, tabs 374 and 375 of filter 342 are inserted into corresponding grooves 376 and 377 to secure filter 342 to basedeck 302. Disc 305 is then mounted to spindle 313 over filter 342. Second, tabs 354 and 355 of filter 340 are inserted into corresponding grooves 356 and 357 to secure filter 340 to basedeck 302. Disc 307 is then mounted to spindle 313 over filter 340. Next, tabs 364 and 365 of filter 341 are inserted into grooves 366 and 367 to secure filter 341 to basedeck 302. It should be understood that additional discs and filters can be mounted to basedeck 302 and similarly assembled in disc drive 300.

Figure 5:
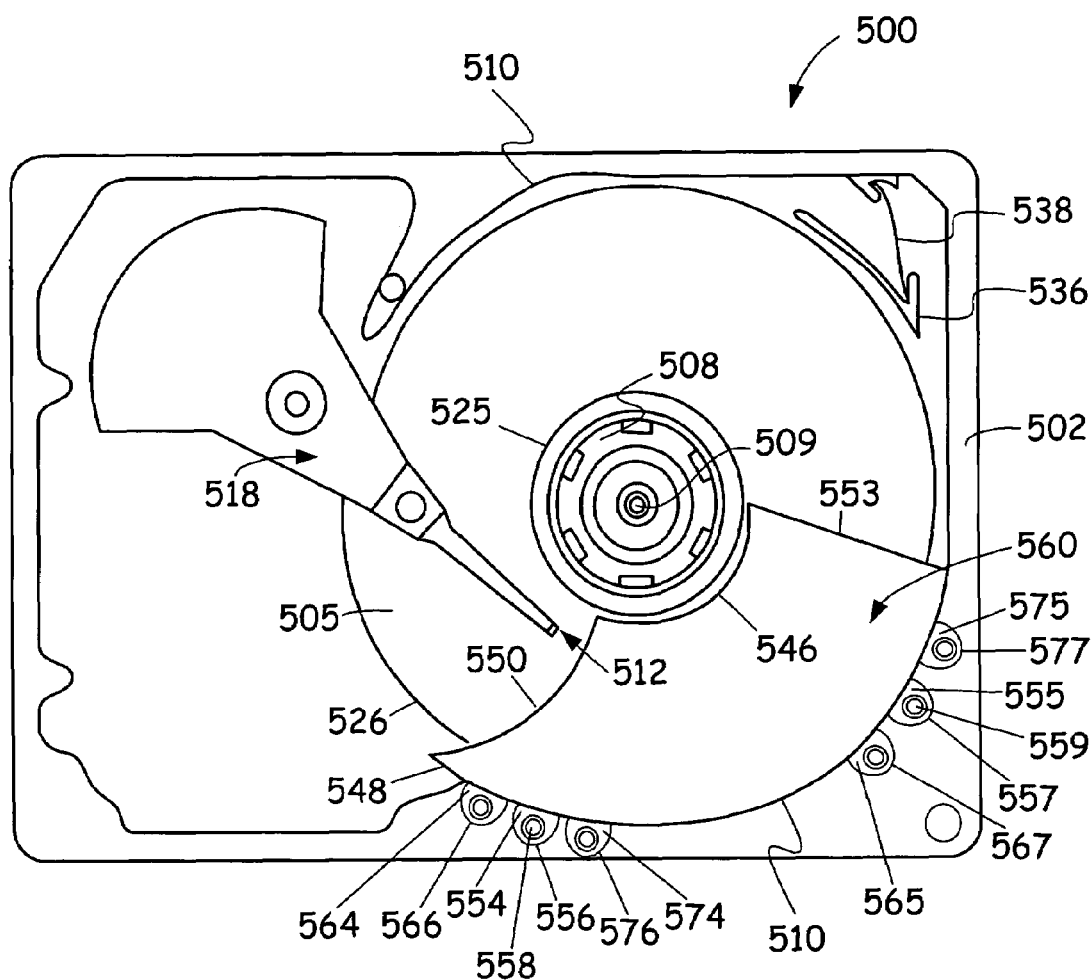
FIG. 5 is a plan view of a disc drive in accordance with an embodiment of the present invention.
Figure 6:
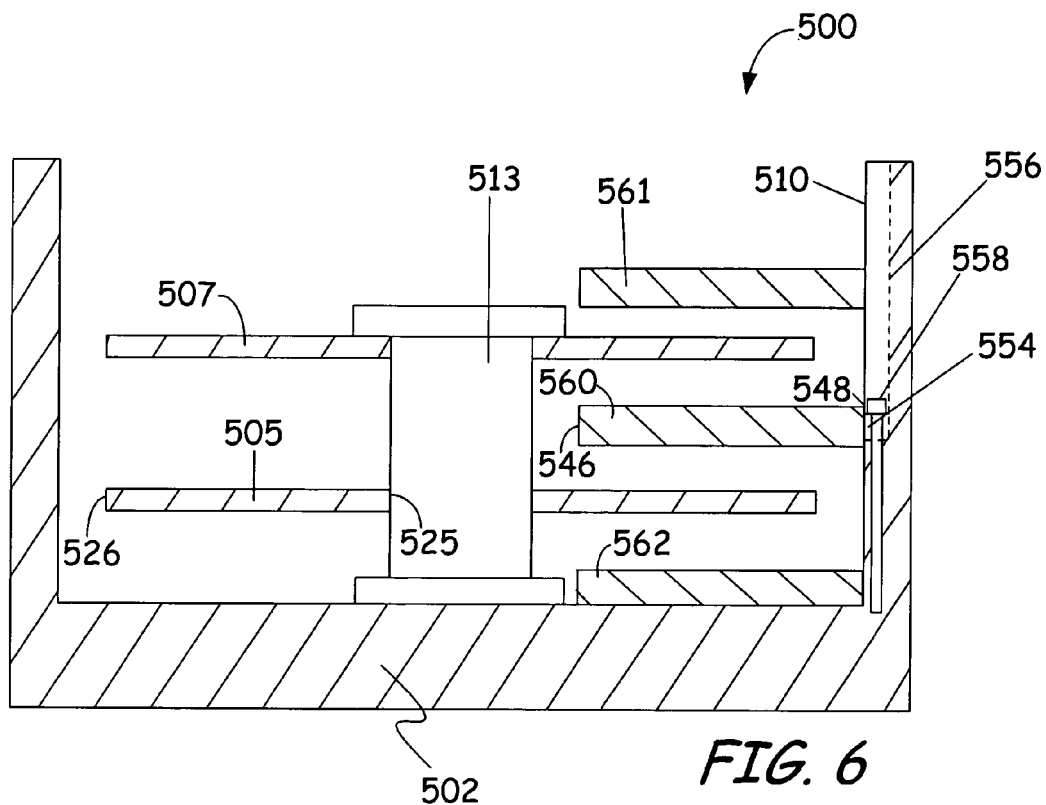
FIG. 6 is a cross-sectional view of the disc drive shown in FIG. 5 in accordance with an embodiment of the present invention.

FIG. 5 is a plan view of disc drive 500 in accordance with an embodiment of the present invention. FIG. 6 is a cross-sectional view of disc drive 500 as shown in FIG. 5. As shown in FIG. 6, disc drive 500 has a plurality of filters 560, 561 and 562 interleaved with two discs 505 and 507. Filter 560 is disposed between and substantially parallel to discs 505 and 507. Note that in FIG. 5, disc 507 and filter 561 are removed so that filter 560 and disc 505 can be seen.

Filter 560 has a rounded inner surface 546 that approaches inner disc diameter 525 and a rounded outer surface 548 adjacent shroud wall 510. Filter 560 radially extends from inner surface 546 to outer surface 548. Filter 560 also includes leading edge 550 located downstream of sliders 512 and trailing edge 553 positioned upstream of sliders 512. Filter 560 angularly extends from leading edge 550 to trailing edge 553. Filter 560 is smaller than the filters of FIGS. 3 and 4 in that it occupies less angular space between the discs.

In the embodiment of FIG. 5, leading edge 550 has a shape that matches the contours of the arcuate path of sliders 512 such that sliders 512 may be disposed in close relationship to leading edge 550 and still move freely. Both leading edge 550 and trailing edge 553 are bound by inner surface 546 and outer surface 548. Note that although the shape of only filter 560 is discussed above, those skilled in the art will recognize that filters 561 and 562 have similar shapes.

Filter 560 of FIGS. 5 and 6 includes a plurality of tabs, such as tabs 554 and 555, located along the outer surface 548 of filter 560. Basedeck 502 of FIGS. 5 and 6 includes a plurality of grooves, such as grooves 556 and 557, located along the shroud wall 510. Each of the plurality of tabs correspond with each of the plurality of grooves such that filter 560 is mounted to basedeck 502. Filter 561 includes tabs 564 and 565 and filter 562 includes tabs 574 and 575, which are located along the outer surfaces of those filters and fit within grooves 566, 567, 576 and 577, respectively, along shroud wall 510. Each of the plurality of filters 560, 561 and 562 is independently mounted to basedeck 502 by engaging the plurality of tabs to the bottom of the plurality of grooves.

During manufacture of disc drive 500, tabs 574 and 575 of filter 562 are first inserted into the corresponding grooves 576 and 577 to secure filter 562 to basedeck 502. Disc 505 is then mounted to spindle 513 over filter 562. Second, tabs 554 and 555 of filter 560 are inserted into corresponding grooves 556 and 557 to secure filter 560 to basedeck 502. Disc 507 is then mounted to spindle 513 over filter 560. Next, tabs 564 and 565 of filter 561 are inserted into grooves 566 and 567 to secure filter 561 to basedeck 502. Fasteners are vertically aligned and positioned through each of the plurality of tabs. For example, fasteners 558 and 559 ensure that filter 560 is tightly secured to basedeck 502. Examples of suitable fasteners 558 include screws or pins. It should be understood that additional discs and filters can be mounted to basedeck 502 and similarly assembled in disc drive 500.

Figure 7:
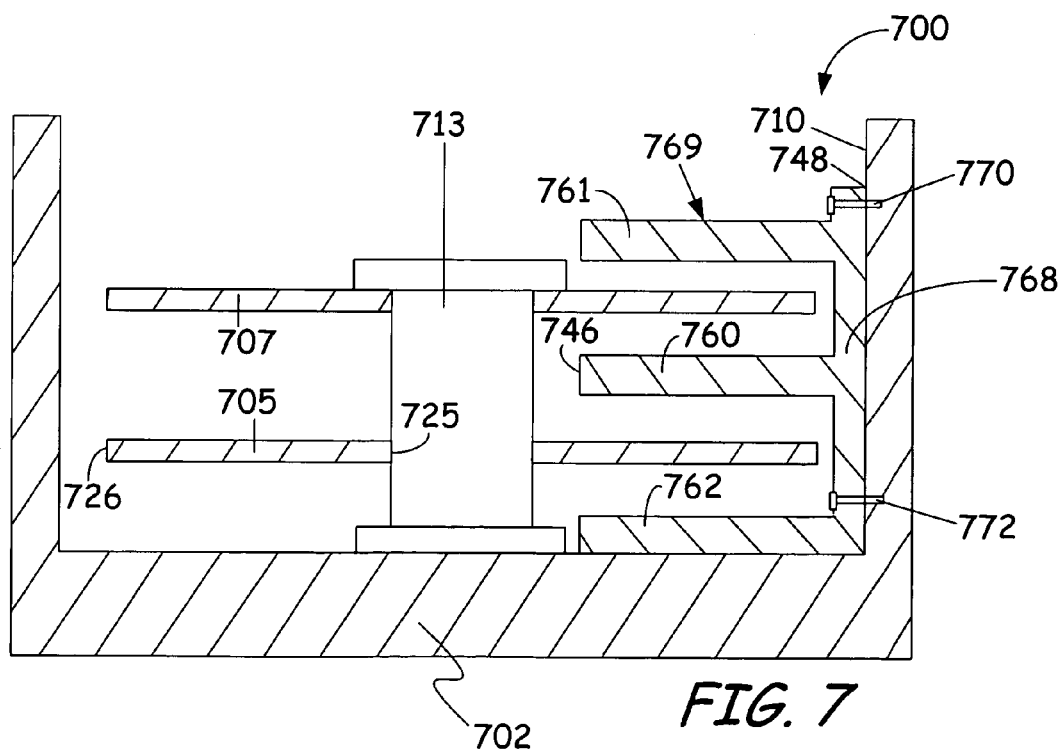
FIG. 7 is a cross-sectional view of a disc drive shown in accordance with an embodiment of the present invention.

FIG. 7 is a cross-sectional view of a disc drive 700 having a plurality of filters 760, 761 and 762 that form filter assembly 769 in accordance with another embodiment of the present invention. Each of the filters 760, 761 and 762 have the same shape as filter 560 of FIG. 5. Filter assembly 769 includes a connecting piece 768 coupled to filters 760, 761 and 762 at the outer circumference 748 of filter assembly 769. During assembly, filter assembly 769 is first constructed by forming the filter assembly 769 as a single piece or by attaching filters 760, 761 and 762 to connecting piece 768. Discs 705 and 707 are then mounted to the spindle 713. Filter assembly 769 is then slid into position from the side of the disc pack so that filters 760, 761 and 762 are interleaved with discs 705 and 707. Once in place, locking features 770 and 772 of connecting piece 768 are secured to basedeck 702.

Figure 8:
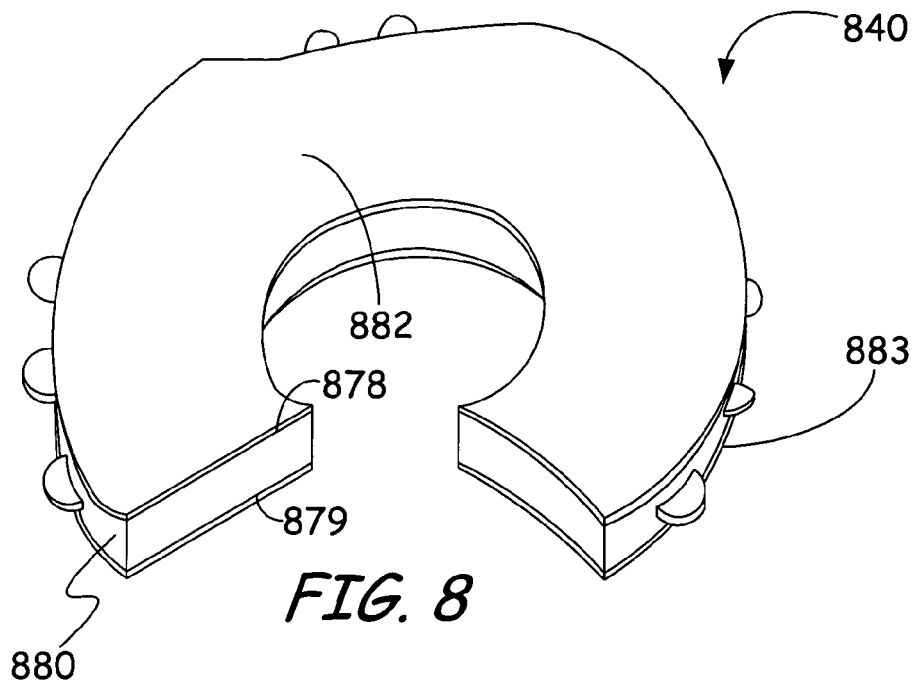
FIG. 8 is a perspective view of a filter in accordance with an embodiment of the present invention.
Figure 9:
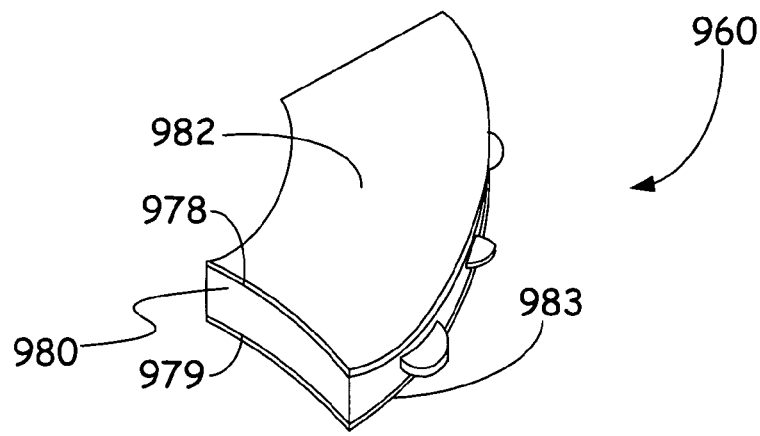
FIG. 9 is a perspective view of a filter in accordance with an embodiment of the present invention.
Figure 10:
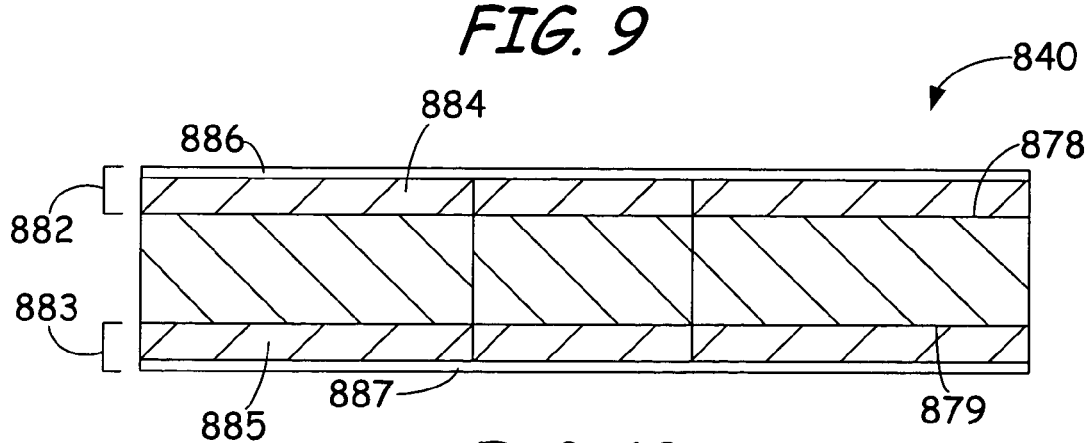
FIG. 10 is a cross-sectional view of the filter shown in FIG. 8 in accordance with an embodiment of the present invention.

FIGS. 8 and 9 provide a perspective view of one construction of filters 340 and 560, respectively, referred to as filters 840 and 960. FIG. 10 provides a cross-sectional view of filter 840 of FIG. 8. However, the layers shown in the cross-sectional view of FIG. 10 are also found in filter 960 of FIG. 9.

Filters 840 and 960 are formed of a rigid or semi-rigid member 880 and 980, respectively, that is constructed of a material such as plastic, aluminum or some type of steel. This list of example materials is not exhaustive and filters 840 and 960 can be made of other materials with similar properties. Members 880 and 980 include first surfaces 878, 978 and second surfaces 879, 979, respectively. First surfaces 878, 978 and second surfaces 879, 979 are covered by filter elements 882, 982 and 883, 983 respectively. Filter elements 882, 982 and 883, 983 are substantially parallel to the discs, such as discs 305 and 307 of FIG. 3 and discs 505 and 507 of FIG. 5. In one embodiment, filter elements 882, 982 and 883, 983 are electrically charged elements such as a single layer of impermeable electrostatic film or a multi-layer electrically charged filter. As airflow passes over filter elements 882, 982 and 883, 983, the electrostatic properties of the layers collect particles from the airflow.

In FIG. 10, filter elements 882 and 883 are depicted as a multi-layer electrically charged filter with a filter media 884, 885 covered by a layer of scrim material 886, 887. For example, the filter media 884, 885 can be a fibrous carpet filter. The carpet filter cleans air as air passes through the carpet filter. These filters are manufactured by W. L. Gore & Associates, Inc. of Newark, Del. and Donaldson Company, Inc. of Minneapolis, Minn. The scrim material 886, 887, is a mesh-like material made with Polytetrafluoroethylene (PTFE) or other kinds of similar materials.

Figure 11:
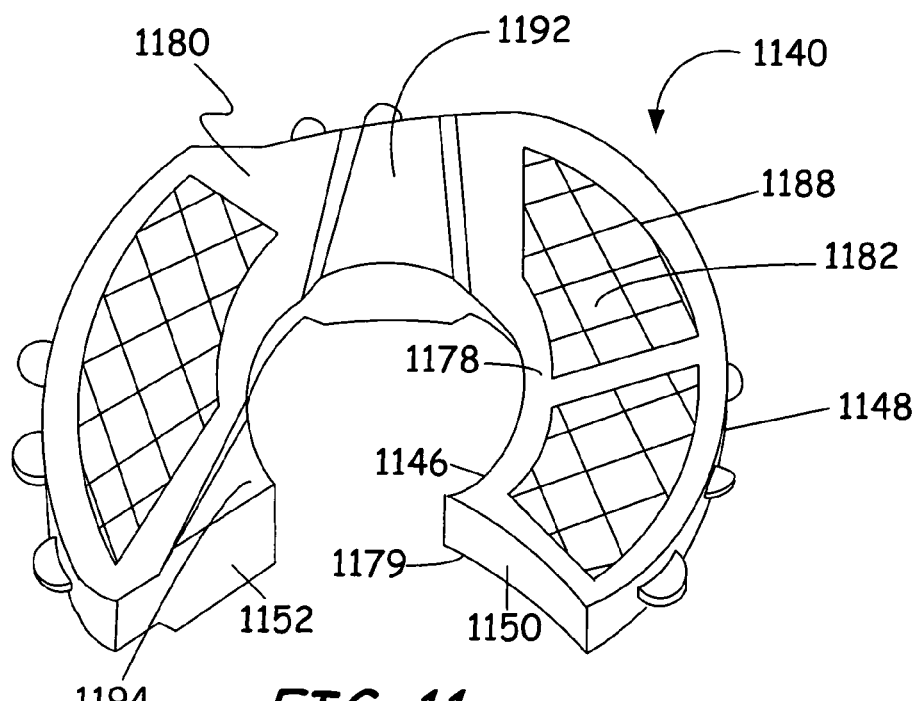
FIG. 11 is a perspective view of a filter in accordance with an embodiment of the present invention.
Figure 12:
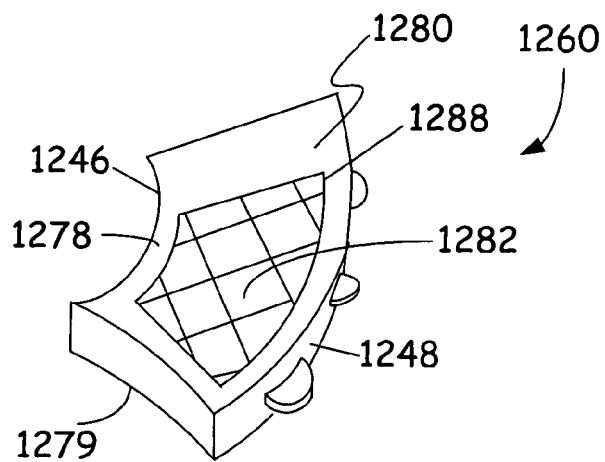
FIG. 12 is a perspective view of a filter in accordance with an embodiment of the present invention.
Figure 13:
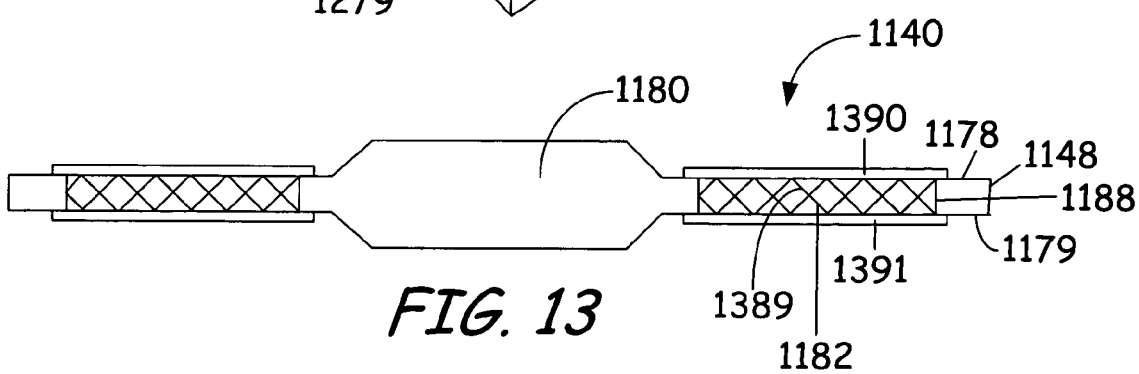
FIG. 13 is a cross-sectional view of the filter shown in FIG. 11 in accordance with an embodiment of the present invention.

FIGS. 11 and 12 provide perspective views of a second construction of filters 340 and 560, respectively, which are referred to as filters 1140 and 1260. FIG. 13 is a cross-sectional view of filter 1140 illustrated in FIG. 11.

Filters 1140 and 1260 include a rigid or semi-rigid member 1180, 1280, respectively, having at least one opening 1188, 1288. For example, members 1180 and 1280 can be constructed of plastic, aluminum or some type of steel. This list of example materials is not exhaustive and other materials with similar properties may be used. Filter 1140 includes first surface 1178 and second surface 1179 that radially extend from outer surface 1148 to the inner surface 1146. Opening 1188 extends through the thickness of filter 1140 from first surface 1178 to second surface 1179. Filter 1260 includes a first surface 1278 and a second surface 1279 that radially extend from outer surface 1248 to inner surface 1246. Opening 1288 extends through the thickness of filter 1260 from first surface 1278 to second surface 1279.

As shown in FIG. 13, the at least one opening 1188 of filter 1140 houses a filter element 1182. Filter element 1182 is substantially parallel to the discs, such as discs 305 and 307 of FIG. 3. In one embodiment, filter element 1182 is a single electrically charged layer as shown in FIG. 11. In another embodiment shown in FIG. 13, filter element 1182 is a fibrous carpet filter 1389 positioned between scrim material layers 1390 and 1391. Scrim layer 1390 is located on first surface 1178 and scrim layer 1391 is located on second surface 1179 and both extend across the at least one opening 1188. Scrim layers 1390 and 1391 hold fibrous carpet filter 1389 in place. Similar filter materials may be used as filter element 1282 in opening 1288 of filter 1260.

In addition to the at least one opening 1188 in filter 1140, filter 1140 also includes at least one contour such as contoured air guide 1192 and contoured air dam 1194. Air guide 1192 extends from inner surface 1146 to outer surface 1148. Air guide 1192 directs the airflow away from the central axis of the discs, such as central axis 309 of FIG. 3, to a recirculation filter, such as recirculation filter 338, to increase the efficiency of the recirculation filter. Air dam 1194 is located on trailing edge 1152 of filter 1140 and comprises a contoured flared portion that restricts the passage of air and further operates to laminate the airflow. By laminarizing the airflow, turbulence is reduced in the airflow thereby reducing vibration of the discs. In addition, air dam 1194 will force airflow to voice coil motor, such as voice coil motor 322, to reduce the airflow excitation on track accessing arm 316 and suspension 314.

FIGS. 14 and 15 are perspective views of alternative constructions of filters 340 and 560, respectively, which are referred to as filters 1440 and 1560, in accordance with an embodiment of the present invention. FIG. 16 is a cross-sectional view of filter 1440.

Filters 1440 and 1560 comprise rigid or semi-rigid hollow members 1480 and 1580 formed of plastic, aluminum or some type of steel. This list of example materials is not exhaustive and filters 1440 and 1560 can be constructed of other materials with similar properties. Filters 1440 and 1560 have leading edges 1450 and 1550 and trailing edges 1452 and 1553 that extend from the inner surfaces 1446 and 1546 to the outer surfaces 1448 and 1548. The hollow interiors extend angularly through filters 1440 and 1560 from the leading edges to the trailing edges and are open on leading edges 1450 and 1550 at openings 1495 and 1595 and on trailing edges 1452 and 1553 at openings 1496 and 1596.

Openings 1495 and 1496 of filter 1440 house filter elements 1482 and 1483 and opening 1595 houses filter element 1582. Although blocked from view, opening 1596 also houses a filter element. Filter elements 1482, 1483 and 1582 are substantially perpendicular to the discs, such as discs 305 and 307 of FIG. 3 and discs 505 and 507 of FIG. 5. Filter elements 1482, 1483 and 1582 clean the airflow as it passes by the filter elements. In one embodiment, filter elements 1482, 1483 and 1582 are electrically charged filter media. In another embodiment, filter elements 1482, 1483 and 1582 are a fibrous carpet filter. In yet another embodiment, filter elements 1482, 1483 and 1582 are a carbon adsorber and/or desiccant such that filter elements 1482, 1483 and 1582 clean chemical contamination as well as water vapor from the airflow. In further embodiments, filter elements 1482, 1483 and 1582 include a scrim layer that covers the openings. The scrim layer extends across a fibrous carpet filter. In some embodiments, a filter element fills the entire hollow volume from openings 1495, 1595 to openings 1496, 1596. In other embodiments multiple individual filter elements are dispersed within the hollow volumes of the filters.

In yet another alternative, the outer surface of members 1480 and 1580 are covered by a filter element. In one embodiment, the filter element is a single electrically charged layer. In another embodiment, the filter element is a filter media covered by a layer of scrim material. For example, the filter media can be a fibrous carpet filter and scrim material as described in FIG. 8.

The parallel and perpendicular orientation of filters between, above and below the plurality of discs in a disc drive improves the particle collection efficiency of the data storage system as well as increases overall performance of the disc drive. These filters collect particles that would otherwise not be captured by the recirculation filter or collect such particles faster then they would be captured by the recirculation filter.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a filter for a data storage, it will be appreciated by those skilled in the art that the teachings of the present invention can be applied to other systems, without departing from the scope and spirit of the present invention.

What is claimed is:

1. A system comprising:
    at least two discs that rotate about a central axis;
    an actuator mechanism configured to position transducing heads; and
    at least one filter disposed between the at least two discs, wherein the at least one filter has an arcuate inner circumference and an arcuate outer circumference, and wherein the at least one filter extends radially from the inner circumference to the outer circumference.

2. The system of claim 1, wherein the filter is mounted to a basedeck of the system.

3. The system of claim 2, wherein the filter includes a plurality of filters, each of the plurality of filters independently mounted to the basedeck.

4. The system of claim 1, wherein both the inner circumference and the outer circumference of the at least one filter are substantially circular.

5. The system of claim 1, wherein the filter is between a pair of the at least two discs.

6. The system of claim 1, wherein the filter comprises at least one surface covered with a filter element.

7. The system of claim 6, wherein the filter element is an electrically charged layer.

8. The system of claim 6, wherein the filter element is a filter media covered by a layer of scrim material.

9. The system of claim 1, wherein at least one of the inner circumference and the outer circumference of the at least one filter is substantially circular.

10. The system of claim 9, wherein the at least one filter is substantially flat and is positioned substantially parallel to the discs.

11. The system of claim 9, wherein the filter comprises a leading edge downstream of the actuator mechanism and a trailing edge upstream of the actuator mechanism.

12. The system of claim 1, wherein the at least one filter is substantially flat and is positioned substantially parallel to the discs.

13. The system of claim 1, wherein the inner circumference approaches an inner diameter of the discs and the outer circumference is adjacent a shroud surrounding the discs.

14. The system of claim 1, wherein the filter comprises a leading edge downstream of the actuator mechanism and a trailing edge upstream of the actuator mechanism.

15. The system of claim 14, wherein the leading edge of the filter has an arcuate shape.

16. The system of claim 15, wherein the arcuate shape of the leading edge of the filter matches a path of movement of the actuator mechanism.

17. A method of removing particles from an airflow within a data storage system, the method comprising:
    generating an airflow in a space between at least two discs; and
    filtering the airflow with a filter disposed between the at least two discs, wherein the filter has an arcuate inner circumference and an arcuate outer circumference, and wherein the filter extends radially from the inner circumference to the outer circumference.

18. The method of claim 17, wherein filtering the airflow further comprises passing airflow over a filter surface that is substantially parallel to the at least two discs.

19. The method of claim 17, wherein at least one of the inner circumference and the outer circumference of the filter is substantially circular.

20. A system comprising:
 at least two discs which rotate about a central axis thereby producing a corresponding airflow; and
 filtering means for filtering the airflow between the two discs, wherein the filtering means comprise a filter disposed between the at least two discs, and wherein the filter has an arcuate inner circumference and an arcuate outer circumference, and wherein the filter extends radially from the inner circumference to the outer circumference.

21. The system of claim 20, wherein the filtering means comprises a filter element on an exterior surface thereof.

22. The system of claim 21, wherein the filter element comprises an electrically charged material.

23. The system of claim 21, wherein at least one of the inner circumference and the outer circumference of the at least one filter is substantially circular.

24. The system of claim 20, wherein the filtering means comprises a plurality of filters interleaved with at least two discs.

* * * * *